(12) United States Patent
Umesawa (10) Patent No.: US 11,570,492 B2
(45) Date of Patent: Jan. 31, 2023

(54) IMAGE CAPTURING SYSTEM, DISTRIBUTION APPARATUS, IMAGE CAPTURING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Takeo Umesawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/544,071

(22) Filed: Dec. 7, 2021

(65) Prior Publication Data

US 2022/0191565 A1   Jun. 16, 2022

(30) Foreign Application Priority Data

Dec. 15, 2020   (JP) .............................. JP2020-207687

(51) Int. Cl.
*H04N 21/234*   (2011.01)
*H04N 19/136*   (2014.01)
*H04N 19/159*   (2014.01)
*H04N 19/167*   (2014.01)
*H04N 21/472*   (2011.01)
*H04N 21/2343*  (2011.01)
(Continued)

(52) U.S. Cl.
CPC .............. *H04N 21/234345* (2013.01); *H04N 5/23229* (2013.01); *H04N 7/0127* (2013.01); *H04N 19/136* (2014.11); *H04N 19/159* (2014.11); *H04N 19/167* (2014.11); *H04N 21/4728* (2013.01)

(58) Field of Classification Search
CPC ....... H04N 21/234345; H04N 21/4728; H04N 19/136; H04N 19/159; H04N 19/167; H04N 5/23229; H04N 7/0127
USPC ........................................................ 725/116
See application file for complete search history.

(56) References Cited

U.S. PATENT DOCUMENTS

2012/0016965 A1* 1/2012 Chen ................ H04N 21/23439
709/219
2020/0137338 A1* 4/2020 Ohshitanai ........... H04N 5/3454
(Continued)

FOREIGN PATENT DOCUMENTS

JP            5082134 B2    11/2012

*Primary Examiner* — Dominic D Saltarelli
(74) *Attorney, Agent, or Firm* — Cowan, Liebowitz & Latman, P.C.

(57) ABSTRACT

This invention provides a system including an image capturing apparatus and a distribution apparatus, wherein the image capturing apparatus includes an image capturing unit capturing images of a plurality of resolutions, a dividing unit dividing each of the images into tiles having a preset size, an encoding unit encoding images, and an output unit outputting encoded data to the distribution apparatus, and wherein the distribution apparatus includes a distributing unit distributing, as a video stream, encoded data of a tile requested by a client on a network to the client, and an encode control unit changing a frame interval of intra-frame compression of a tile corresponding to a region of interest requested from a client on a network, in accordance with the number of times of designation of the tile, and setting the changed in the encoding unit.

14 Claims, 8 Drawing Sheets

(51) Int. Cl.
*H04N 7/01* (2006.01)
*H04N 5/232* (2006.01)
*H04N 21/4728* (2011.01)

(56) References Cited

U.S. PATENT DOCUMENTS

2021/0027752 A1* 1/2021 Holmes ................... G06F 3/147
2021/0142520 A1* 5/2021 Krishnan ............. H04N 19/176
2022/0329883 A1* 10/2022 Stokking ............ H04N 21/2353

* cited by examiner

IMAGE CAPTURING SYSTEM, DISTRIBUTION APPARATUS, IMAGE CAPTURING APPARATUS, CONTROL METHOD, AND NON-TRANSITORY COMPUTER-READABLE STORAGE MEDIUM

BACKGROUND OF THE INVENTION

Field of the Invention

The present invention relates to an image capturing system, a distribution apparatus, an image capturing apparatus, a control method, and a non-transitory computer-readable storage medium.

Description of the Related Art

Techniques for increasing the ratio of intra-frame compression frames when a predetermined object is detected have been known conventionally. Japanese Patent No. 5082134, for example, is a document that discloses one of such techniques.

SUMMARY OF THE INVENTION

An issue to be solved by the present invention is to provide a technique for shortening a video switching time.

According to an aspect of the invention, there is provided an image capturing system constituted by an image capturing apparatus and a distribution apparatus that distributes a video image obtained by the image capturing apparatus, via a network, wherein the image capturing apparatus includes: an image capturing unit that performs image capturing at a predetermined frame rate, and outputs images of a plurality of resolutions, a dividing unit that divides each of the images of respective resolutions obtained by the image capturing unit into tiles having a preset size, an encoding unit that encodes images of tiles obtained by the dividing unit, using intra-frame compression and inter-frame compression, and is capable of independently setting a frame interval at which intra-frame compression is performed for each tile, and an output unit that outputs encoded data of tiles obtained by the encoding unit to the distribution apparatus, and wherein the distribution apparatus includes: a distributing unit that designates a tile corresponding to a region of interest requested from a client on a network, and distributes encoded data of the designated tile as a video stream to the client, and an encode control unit that changes a frame interval of intra-frame compression frames of a tile corresponding to a region of interest requested from a client on a network, in accordance with the number of times of designation of the tile, and sets the changed frame interval in the encoding unit.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Prior to describing a configuration example of an image capturing system according to a first embodiment, an issue regarding an image capturing system that realizes high scalability and bandwidth management will be described with reference to FIGS. 1 to 4.

Figure 1:
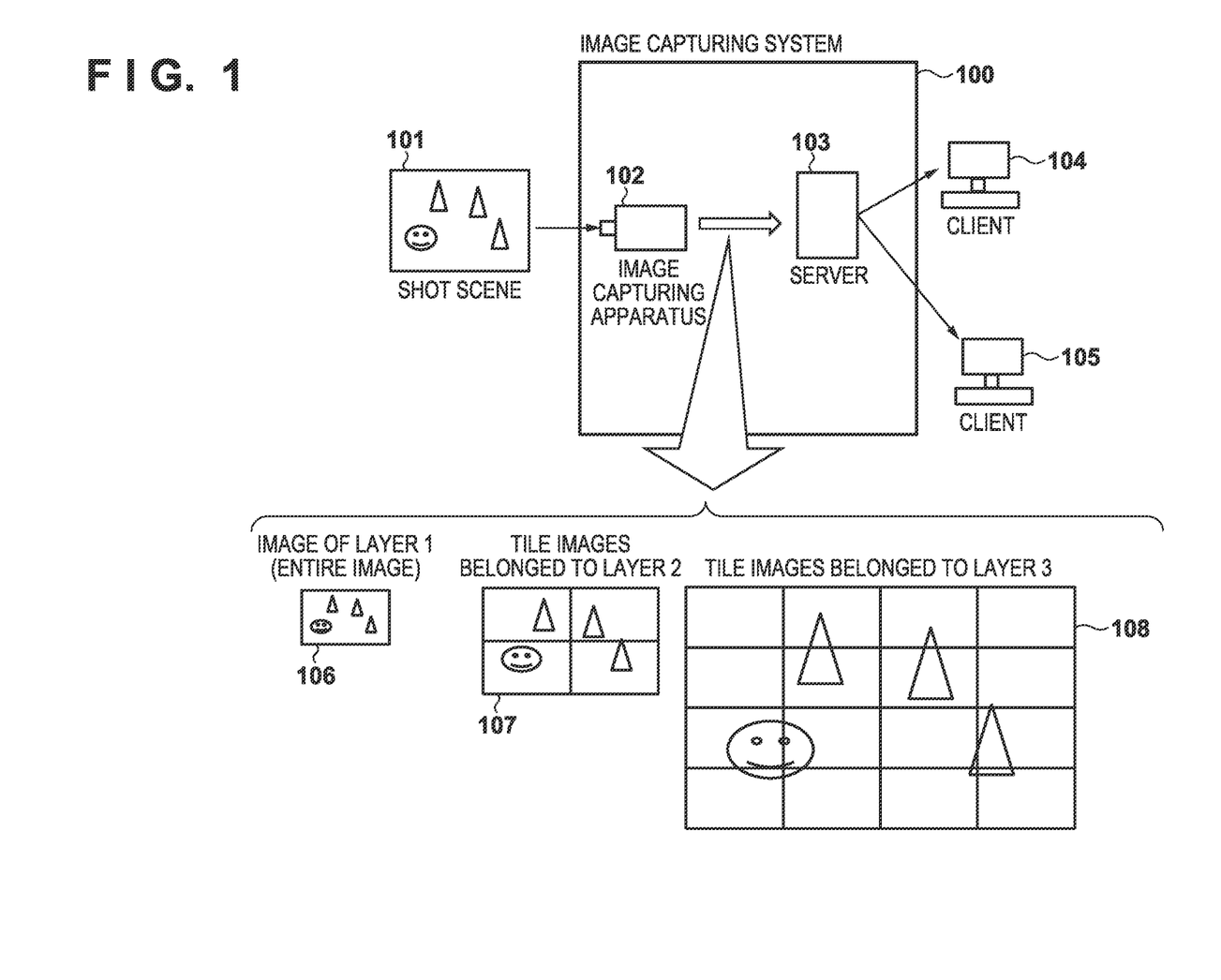
FIG. 1 is a conceptual diagram of a system according to a first embodiment.

FIG. 1 is a conceptual diagram showing an example of the configuration of the image capturing system that performs high scalability and bandwidth management.

An image capturing system 100 is constituted by an image capturing apparatus 102 and a server 103. The server 103 stores a scene 101 supplied from the image capturing apparatus 102, in a predetermined storage device (hard disk, etc.), and distributes the scene 101 to clients 104 and 105 that are operated by the user, via a (wired or wireless) network. Note that, here, the clients 104 and 105 are disposed outside the image capturing system 100, but may also be members that constitute the image capturing system 100. In addition, the scene 101 may be temporarily stored in the storage device or does not need to be stored in a case of real time distribution. In addition, the two clients are shown in drawings for convenience, and there is no particular limitation to the number of clients.

Figure 2:
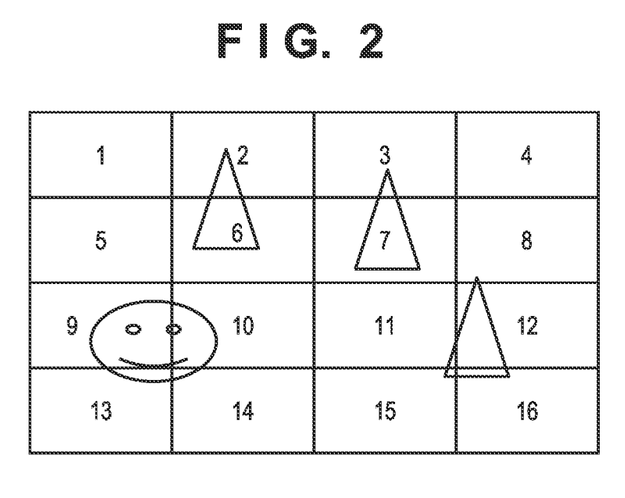
FIG. 2 is a diagram illustrating tile division according to the first embodiment.

The image capturing apparatus 102 generates video images of a plurality of resolutions from the shot scene 101, and transmits the images to the server 103. The images generated by the image capturing apparatus 102 are an image 106 of a low resolution, an image 107 of a moderate resolution, and an image 108 of a high resolution, for example. Here, in an embodiment of the present invention, an image of the lowest resolution is defined as a layer 1, and an image of a moderate resolution is defined as a layer 2, that is to say, an image of a higher resolution is indicated by a layer with a higher reference numeral. The image capturing apparatus 102 obtains one tile from the image of the layer 1 (not divided), divides the image of the layer 2 into 2×2 tiles and the image of the layer 3 into 4×4 tiles, for example, then compresses the video images of the respective divided tile images using a compressor capable of intra-frame compression and inter-frame compression such as H.264, and transmits the compressed images to the server 103. Here, assuming that the highest layer number is three, and a number of division an i-th layer is indicated by $n_i$, then $n_1=1$, $n_2=4$, and $n_3=16$ in the illustrated case for simplification, and any value may be used as the highest layer number and the number of division of each layer. Here, a tile image generated by the image capturing apparatus 102 is indicated by $A_{ij}$ wherein i indicates a layer number of the tile image, and j indicates a value indicating the position of the tile. Here, for example, as shown in FIG. 2, the position of the tile on the top left is indicated by "1" as an origin, the tile adjacent thereto on the right is given a "subsequent number", and the rest is given numbers in raster scan order. The server 103 receives and temporarily holds the total number $\Sigma n_i$ of tile images (tile video images) for each frame captured by the image capturing apparatus 102.

On the other hand, one of or both the client 104 and the client 105 transmit a video data obtaining request to the server 103. When the server 103 receives the video data obtaining request from the client 104, for example, the server 103 first transmits a shot scene of the image 106 of the layer 1 to the client 104.

Figure 3:
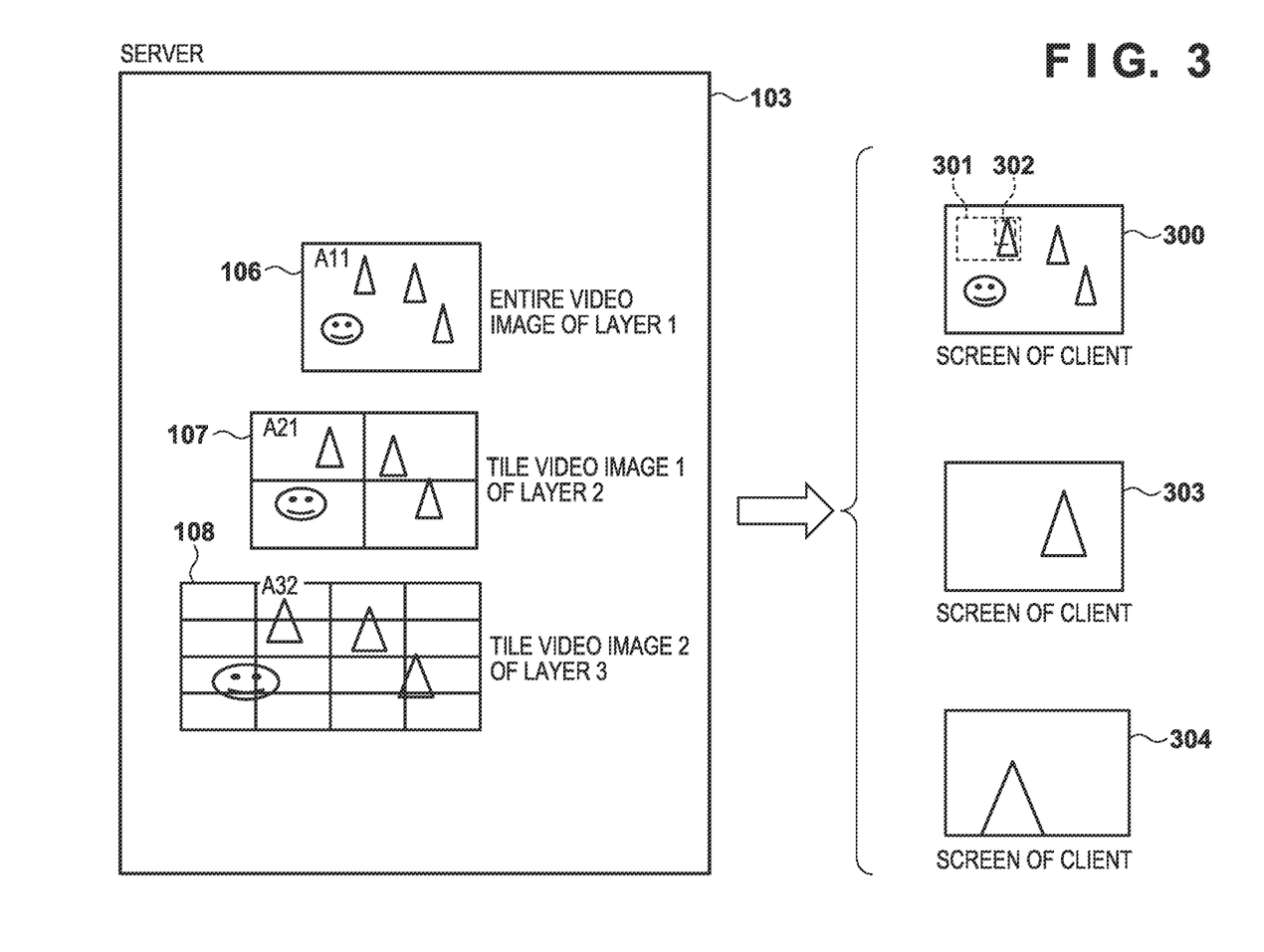
FIG. 3 is a diagram illustrating the system according to the first embodiment.

Here, reference numeral 300 in FIG. 3 indicates a video image (entire video image=1 tile) of the layer 1 that is displayed on (the display device of) the client 104. Now, assume that the user operates a mouse or touch panel (not illustrated), and sets a region 301 in the displayed video image 300 to be a region to be watched (hereinafter, "region of interest"). At this time, the client 104 transmits a video obtaining command that includes information for specifying the region of interest, to the server 103. Upon receiving the command, the server 103 transmits the video image of a tile A21 of the layer 2 corresponding to the position of the region of interest, to the client 104. As a result, the video image that is displayed on the client 104 changes to a video image 303.

Figure 4:
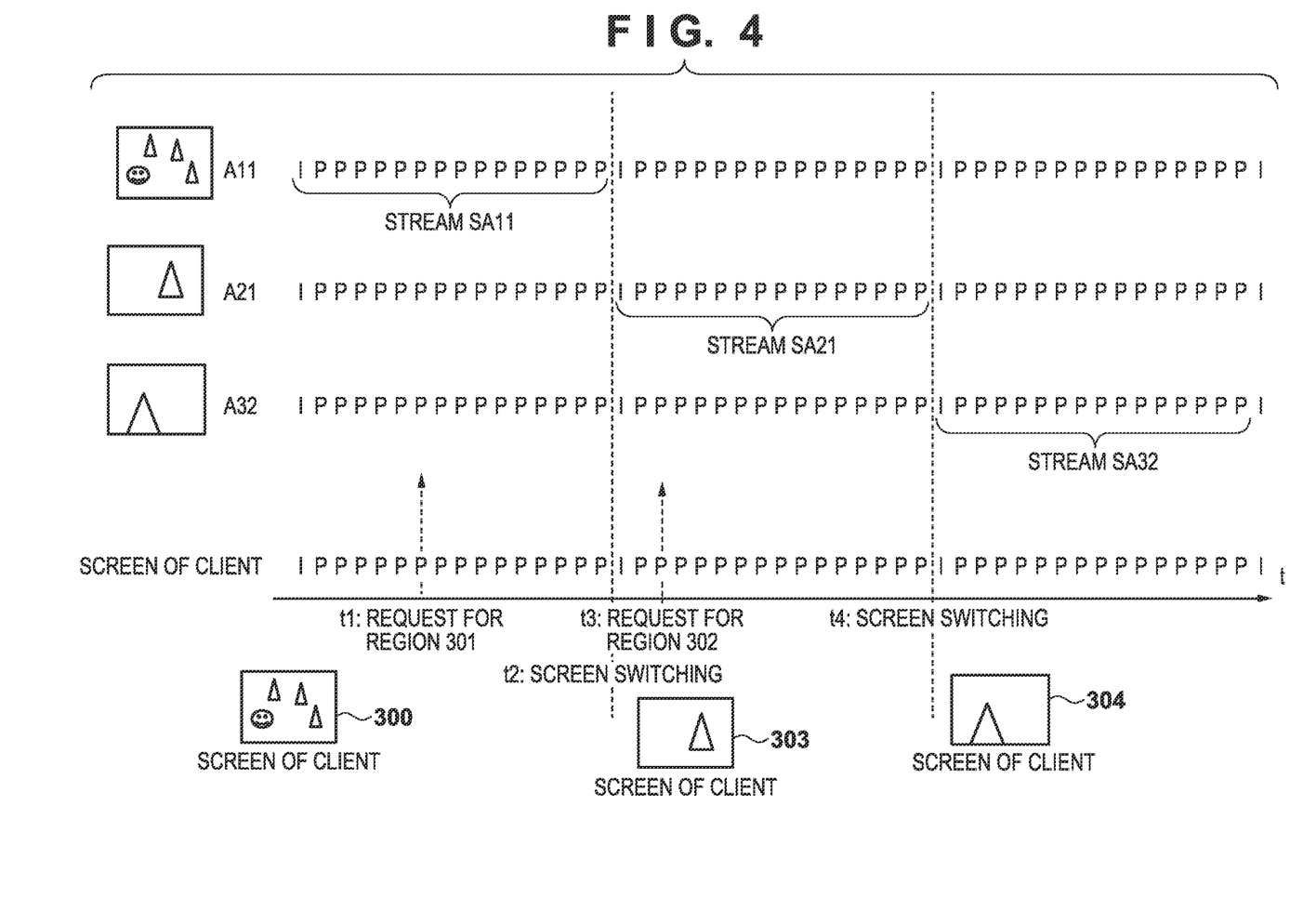
FIG. 4 is a diagram illustrating time series switching according to the first embodiment.

In addition, when the user that is watching the video image 300 sets a region 302 as region of interest, the server 103 transmits the video image of a tile A32 that belongs to the layer 3, to the client 104. As a result, the video image that is displayed on the client 104 changes to a video image 304. Note that, hereinafter, a phrase "the video image of the tile A21" that is transmitted to the client is simply referred to as a "tile image A21". FIG. 4 schematically shows the above-described operations and processing with a time axis. The left-to-right direction in FIG. 4 indicates a direction in which a time flows. In addition, here, a flow along the time axis that is related to FIG. 3 is shown, and thus it should be noted that the flow of only tile images A11, A21, and A32 held by the server 103 is shown.

In FIG. 4, "I" indicates a frame for which only intra-frame compression was performed as a coding method, and "P" indicates a frame for which inter-frame compression was also performed.

A video stream SA11 of the tile image A11 is first transmitted to the client 104, and, as a result, the video image 300 is displayed on the client 104.

Assume that, at timing t1, the user sets the region 301 as a region of interest. In this case, the server 103 transmits the current video stream SA11 until timing t2 at which a frame I is obtained by performing only intra-frame compression of the tile image A21. At timing t2 at which the frame I obtained by performing only intra-frame compression of the tile image A21 is transmitted, the server 103 makes a switch to distributing a video stream SA21 of the tile image A21 corresponding to the region of interest 301. In other words/ Specifically, when the user designates the region of interest 301 at timing t1, the tile image A21 of the region of interest 301 is displayed on the client 104 at timing t2 and later.

Similarly, assume that, at timing t3, the user sets the region 302 to be a region of interest. In this case, the server 103 transmits the current video stream SA11 until timing t4 at which the frame I is obtained by performing only intra-frame compression of the tile image A32. Then, a switch is not made to distributing a video stream SA32 of the tile image A32 corresponding to the region 302 until timing t4 at which the frame I obtained by performing only intra-frame compression of the tile image A32 is transmitted. That is to say, when the user designates the region 302 as a region of interest at timing t3, the tile image A32 of the region of interest 302 is displayed on the client 104 at timing t4 and layer.

As described above, the amount of time that is required from when a request for a region of interest was made until when a switch is made to a detailed (higher-resolution) screen of the region of interest is not small. Letting the maximum value of this switching time be $T_w$, then $T_w=1/F_I$. Here, $F_I$ indicates the reciprocal of the cycle in which a frame that has subjected to intra-frame compression appears, in other words, the number of times (frequency at which) intra-frame compression was performed per second. Therefore, in order to shorten the switching time, the cycle in which a frame that has subjected to intra-frame compression appears is shortened (the frequency is increased). However, a code amount resulting from intra-frame compression is much larger than a code amount resulting from inter-frame compression, and thus the shorter the cycle in which intra-frame compression is used is, the more the communication band between the image capturing apparatus 102 and the server 103 is suppressed, and there is the possibility that no video image can be transmitted depending on circumstances.

In this embodiment, the cycle of intra-frame compression of a video image is shortened in accordance with a frequency at which the user sets a region of interest, the switching time maximum value $T_w$ for switching to this region is shortened, and, on the other hand, if the frequency at which a region of interest is set is low, the cycle of intra-frame compression frame is increased (such that the preset maximum cycle is not exceeded), thereby presenting an image capturing system that does not increase the code amount of the all of the video images.

Figure 5:
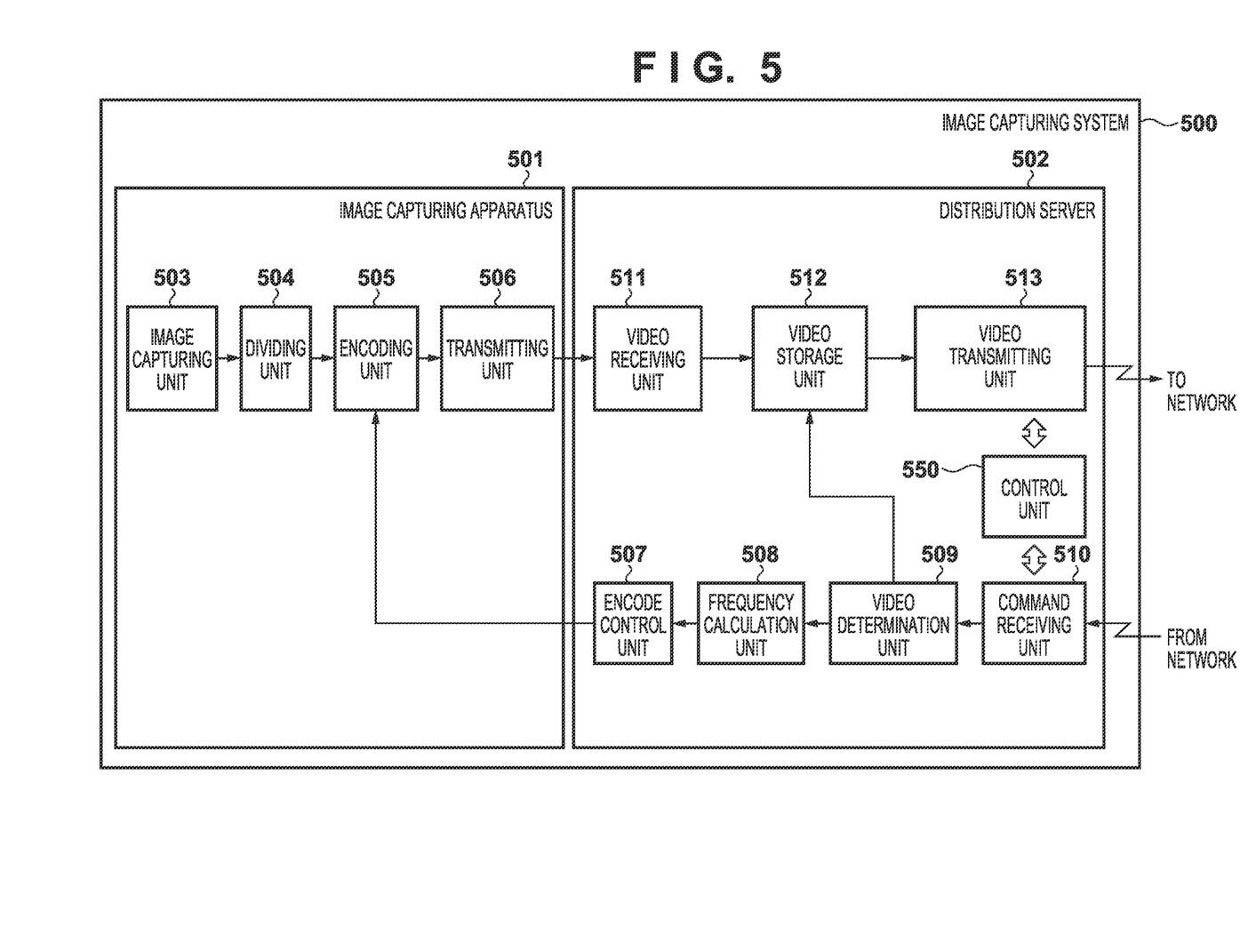
FIG. 5 is a block diagram according to the first embodiment.

FIG. 5 shows a configuration of an image capturing system 500 according to the first embodiment. The configuration and operations thereof will be described below with reference to FIG. 5. Note that it should be understood that the image capturing system 500 in FIG. 5 replaces the image capturing system 100 in FIG. 1.

The image capturing system 500 is constituted by an image capturing apparatus 501 and a distribution server 502. The image capturing apparatus 501 is constituted by an image capturing unit 503, a dividing unit 504, an encoding unit 505, and a transmitting unit 506. The image capturing unit 503 outputs a plurality of video images of different resolutions based on a captured image. Here, an image of the lowest resolution is referred to as an "image of a layer 1", and images of higher resolutions than that are referred to as an "image of a layer 2", an "image of a layer 3", . . . an "image of a layer k" in order. The image capturing unit 503 outputs the images of layers to the dividing unit 504. To put it simply, the image capturing unit 503 includes an image sensor with a resolution of the layer k, and generates a stepwise image of each layer by calculating the average value of regions equivalent to one pixel in the layers. Note that a frame rate at which the image capturing unit 503 performs image capturing is not particularly limited, but, here, a description will be given assuming that image capturing is performed at 30 frames per second.

The dividing unit 504 divides an image of each layer by the number of tiles determined for the layer. Here, the number of division of the image of a layer i is defined as $m_i$. The dividing unit 504 outputs the divided tile images to the encoding unit 505.

The encoding unit 505 selects intra-frame compression or inter-frame compression as appropriate, and encodes a group of tile images input from the dividing unit 504. In addition, the encoding unit 505 according to an embodiment of the present invention is capable of independently setting a ratio at which intra-frame compression is used (an interval at which intra-frame compression is used), for each tile. This ratio at which intra-frame compression is used can be set by an encode control unit 507 of the distribution server 502. For a compressing method of tile images performed by the encoding unit 505, an encoding format for which intra-frame compression and inter-frame compression are used such as H.264 is adopted, but there is no particular limitation to H.264. The encoding unit 505 encodes tile images of layers, and outputs the encoded images to the transmitting unit 506. Here, the total number of tiles M that are generated from an image obtained through a single image capturing operation performed by the image capturing unit 503 is obtained using Expression (1-1) below.

$$M = \Sigma_i m_i \quad (1\text{-}1)$$

The transmitting unit 506 outputs encoded data of tile images input from the encoding unit 505, to the distribution server 502.

Next, the distribution server 502 will be described. The distribution server 502 controls the image capturing apparatus 501 and distributes a video image captured by the image capturing apparatus 501 to a client on a network, in accordance with a request from the client on the network. The distribution server 502 includes a control unit 550 that performs overall control of the distribution server. This control unit 550 includes a CPU, a ROM that stores a program to be executed by the CPU, and a RAM that is used as a work area. This control unit 550 also controls a video receiving unit 511, a video storage unit 512, a video transmitting unit 513, a command receiving unit 510, a video determination unit 509, a frequency calculation unit 508, and the encode control unit 507. Note that the processing executed by these processing units indicated by reference numerals 507 to 513 may be executed by the control unit 550.

The video receiving unit 511 receives encoded data of tiles of layers input from the image capturing apparatus 501, and outputs the encoded data to the video storage unit 512. The video storage unit 512 temporarily stores the encoded data of the tiles input from the video receiving unit 511 to a predetermined storage medium. Here, the storage medium is an SSD (Solid State Drive), for example. In addition, when there is a distribution video request from the video determination unit 509, the video storage unit 512 outputs encoded data of tile images corresponding to the requested video image, to the video transmitting unit 513. Note that, in an embodiment of the present invention, data is recorded in the storage medium, but the storage medium is not an essential function, and a video image for which a distribution video request was made may also be simply output.

The video transmitting unit 513 transmits encoded data of (a group of tiles that constitute) a video image input from the video storage unit 512, to the client that has made the request.

The command receiving unit 510 receives various commands from a client on a network. If a received command is a command for designating a region of interest, the command receiving unit 510 outputs it to the video determination unit 509. Note that, in the command for designating a region of interest, the coordinates of the top left and the bottom right of a rectangle indicating the region of interest in the video image that has been received, or the coordinates of the top left of the rectangle and the sizes of the rectangle in the horizontal and vertical directions are designated. Note that a configuration may also be adopted in which, when a region of interest is designated in units of tiles, information for specifying one or more tiles representing the region of interest is designated.

The video determination unit 509 performs a determination on a tile (the layer and the position of the tile) for which the number of pixels representing the region of interest indicated by the command received by the command receiving unit 510 is largest, from among tiles that include the region of interest, and transmits it to the video storage unit 512.

The frequency calculation unit 508 holds the number of times of selection for each of all of the tiles. The frequency calculation unit 508 also increases the number of times of selection of each tile transmitted from the video determination unit 509, and updates the held number of times. The frequency calculation unit 508 then transmits the updated numbers of times of selection of individual tiles, to the encode control unit 507. The encode control unit 507 receives, from the frequency calculation unit 508, the number of times of each of the all the tile video images has been selected, and, as will be described below, determines the ratio at which intra-frame compression of the tile is to be performed, in other words, the number of times intra-frame compression is to be performed per second.

The number of times $N_{ab}$ intra-frame compression of a tile image $A_{ab}$ is to be performed per second is determined as in Expression (1-2) below, for example.

$$N_{ab} = \frac{N\Omega_{ab} + N}{\sum_{ij} \Omega_{ij} + M} \quad (1\text{-}2)$$

Here, N indicates the number of times intra-frame compression is to be performed per second, which is allowable for all of the tile video images. In addition, $\Omega_{ij}$ indicates the number of times a tile image $A_{ij}$ has been selected. When the number of times $\Sigma\Omega_{ij}$ the user has selected the tile image $A_{ij}$ significantly exceeds the total number M of tile video images defined by Expression (1-1), the number of times Na intra-frame compression of the tile image $A_{ab}$ is to be performed per second can be expressed as Expression (1-2') below.

$$N_{ab} \approx \frac{N\Omega_{ab}}{\sum_{ij} \Omega_{ij}} = NP_{ab} \quad (1\text{-}2')$$

Here, $P_{ab}$ indicates a probability (or percentage) of the tile image $A_{ab}$ having been selected with respect to all of the tile images, as expressed by Expression (1-3) below.

$$P_{ab} = \frac{\Omega_{ab}}{\sum_{ij} \Omega_{ij}} \qquad (1\text{-}3)$$

The number of times intra-frame compression of all of the frames is performed per second is N as expressed by Expression (1-4) below, and thus it can be said that generally there is no change in the total amount of code amounts of all of the tile video images per second.

$$\Sigma_{ij} N_{ij} \approx N \Sigma_{ij} P_{ij} = N \qquad (1\text{-}4)$$

By using such the number of times $N_{ab}$ intra-frame compression of the tile image $A_{ab}$ is performed per second, it is possible to increase the number of intra-frame compression frames for a tile image that has been selected with a high frequency. Assume that, for example, $k_1$ and $k_2$ indicate certain fixed values, and the number of times the tile image $A_{11}$ is selected and the number of times the tile image $A_{ab}$ is selected are respectively $k_1$ times and $k_2$ times larger than those of the other video images, and the other video images are selected with the same probability. Then, the numbers of times of selection of $A_{11}$, $A_{ab}$, and other tiles ($A_{\alpha\beta}$) are expressed by Expressions (1-5) to (1-7) below.

$$\Omega_{11} = \frac{k_1 \sum_{ij} \Omega_{ij}}{M} \qquad (1\text{-}5)$$

$$\Omega_{ab} = \frac{k_2 \sum_{ij} \Omega_{ij}}{M} \qquad (1\text{-}6)$$

$$\Omega_{\alpha\beta} = \frac{(M-(k_1+k_2))\sum_{ij}\Omega_{ij}}{M(M-2)} (\alpha \neq 1, a \;\; \beta \neq 1, b) \qquad (1\text{-}7)$$

Accordingly, the interval $I_{intv}(\;)$ at which intra-frame compression of each of the tile image $A_{11}$, the tile image $A_{ab}$, and the other tile images $A_{\alpha\beta}$) is performed is expressed as Expressions (1-8) to (1-10) below.

$$I_{intv}\, A_{11} = \frac{M}{Nk_1} \qquad (1\text{-}8)$$

$$I_{intv}\, A_{ab} = \frac{M}{Nk_2} \qquad (1\text{-}9)$$

$$I_{intv}\, A_{\alpha\beta} = \frac{M(M-2)}{N(M-k_1-k_2)} \qquad (1\text{-}10)$$

That is to say, in a case where the tile image $A_{11}$ is designed as a region of interest when a tile image other than the tile image $A_{11}$ is displayed, the interval (cycle) of intra-frame compression frames of the tile image $A_{11}$ is changed from M/N to M/(N×$k_1$). In addition, in a case where the tile image $A_{ab}$ is designated as a region of interest when a tile image other than the tile image $A_{ab}$ is displayed, the interval of intra-frame compression frames of the tile image $A_{ab}$ is changed from M/N to M/(N×$k_2$). Thus, the interval of intra-frame compression frames of a tile image that is more frequently designated as a region of interest is smaller (shorter).

Figure 7:
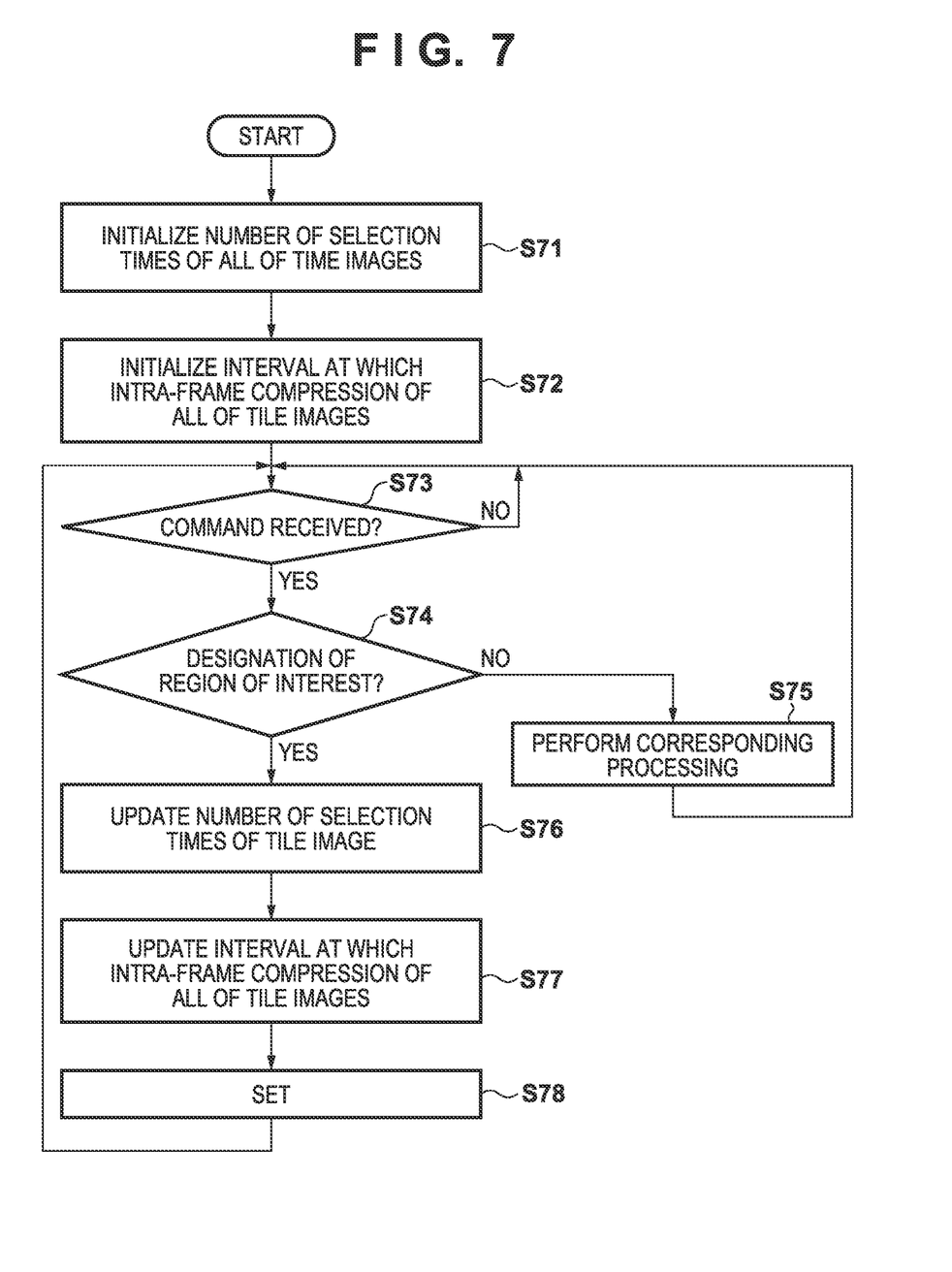
FIG. 7 is a flowchart showing processing for setting an interval of intra-frame compression in a server according to the first embodiment.

FIG. 7 is a flowchart of processing for setting a ratio of intra-frame compression frames of each tile image, the processing being executed by the control unit 550 of the distribution server 502 according to an embodiment of the present invention. Note that processing for distributing tile images is processing for simply transmitting encoded data of requested tile images to a client that has made the request, and thus a description thereof is omitted here. The processing in FIG. 7 starts when the power supply of the distribution server 502 is switched on or reset.

In step S71, the control unit 550 initializes the numbers of times of selection of all of the tile images $A_{ij}$ (i, j=1, 2, . . . ) input by the image capturing apparatus 501, by setting predetermined values. The predetermined values here are positive values such as "10". This is because the denominator of the right side of Expression (1-2') above is nonzero.

Next, the procedure advances to step S72, where the control unit 550 initializes the interval $I_{intv}(\;)$ at which intra-frame compression of each of all the tile images $A_{ij}$ is performed. In this initialization, the interval may be determined in accordance with the communication band between the image capturing apparatus 501 and the distribution server 502.

In step S73, the control unit 550 determines whether or not a command has been received from the client on the network, through monitoring of the command receiving unit 510, and waits for a command to be received. When a command is received, the control unit 550 advances the procedure to step S74.

In step S74, the control unit 550 determines whether or not the received command is a command related to designation of a region of interest. If it is determined that the received command is not a command related to designation of a region of interest, the control unit 550 advances the procedure to step S75, performs processing corresponding to the command, and returns the procedure to step S73 in preparation for receiving the next command. Note that the processing in step S75 is not directly related to this embodiment, and thus a description thereof is omitted here.

Now, in step S74, if the control unit 550 determines that the received command is a command related to designation of a region of interest, the processing advances to step S76.

Figure 8:
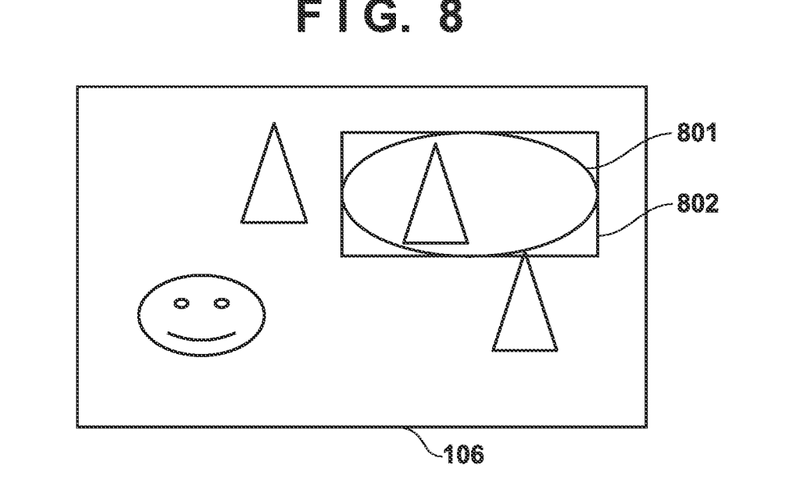
FIG. 8 is a diagram illustrating the relationship between a region of interest and a corresponding tile according to the first embodiment.

In this step S76, the control unit 550 controls the frequency calculation unit 508 so as to specify a tile image corresponding to a new designated region of interest, and increase the number of times of selection of the tile image by "1". The control unit 550 then advances the procedure to step S77. Here, a method for specifying a tile image corresponding to a new region of interest will be described with reference to FIG. 8. The user designates a region of interest 801 from the entire video image 106 of the layer 1. When the region of interest 801 is designated, the control unit 550 calculates the size of a rectangle 802 circumscribing the region of interest 801. When the width and height of the rectangle 802 circumscribing the region of interest are respectively indicated by w and h, and the width and height of the video image 106 of the layer 1 are respectively indicated by W and H, then the control unit 550 obtains a ratio Rw=w/W and a ratio Rh=h/H. On the other hand, the ratio of the width of one tile in the layer i to the width of the entire image of the layer i and the ratio of the height of one tile in the layer i to the height of the entire image of the layer i are respectively indicated by $Rw_i$ and $Rh_i$, and j and k that satisfy $Rw_{j+1}$<Rw<=$Rw_j$ and $Rw_{k+1}$<Rw<=$Rw_k$ are obtained. When the larger of j and k is indicated by r, a tile image corresponding to the new region of interest is selected from a layer r, and it is thereby possible to ensure the image quality that is desired by the user. In addition, the maximum values of x and y coordinates and the minimum values of the x and y coordinates are respectively indicated by ($x_{max}$, $y_{max}$) and ($x_{min}$, $y_{min}$), based on coordinates obtained by normalizing coordinates within the rectangle circumscribing the region of interest using the width and height of the image 106 of the layer 1. In addition, the maximum values of x and y coordinates and the minimum values of the x and y coordinates are respectively indicated by $(x_{max\_s}, y_{max\_s})$ and $(x_{min\_s}, y_{min\_s})$, based on coordinates obtained by normalizing the coordinates of extremities of each tile s of the layer r using the width and height of the image of the layer r. Accordingly, a tile s that satisfies $(sgn(x_{max}-x_{min\_s})+1)*(sgn(x_{max\_s}-x_{min})+1)*(sgn(y_{max}-y_{min\_s})+1)*(sgn\ (y_{max\_s}-y_{min})+1)>0$ is determined as a tile image corresponding to the new region of interest, using a signum function sgn.

Note that, in this step S76, the video determination unit 509 sets information for specifying a tile image of the new region of interest, for the video storage unit 512. During a period of time until when encoded data of the tile image of the new region of interest obtained through intra-frame compression is received from the video receiving unit 511, the video storage unit 512 outputs the tile image of the old region of interest, to the video transmitting unit 513. The video storage unit 512 then outputs the encoded data of the tile image of the new region of interest to the video transmitting unit 513 in accordance with receiving of the encoded data of the tile image of the new region of interest obtained through intra-frame compression, from the video receiving unit 511.

Now, in step S77, the control unit 550 controls the encode control unit 507 so as to calculate intervals at which intra-frame compression of all of the tile images is performed (cycle in which intra-frame compression is performed). In step S78, the control unit 550 then controls the encode control unit 507 so as to set an interval at which intra-frame compression of each tile image is performed, for the encoding unit 505 of the image capturing apparatus 501. The control unit 550 then returns the procedure to step S73, and prepares for the next command.

As described above, according to the first embodiment, the numbers of times or ratios at which intra-frame compression of all the tile image is performed per unit time are determined without changing the code amounts of all of the tile images per unit time. As a result, it is possible to shorten the maximum switching time for switching to a video image that is selected as a region of interest with a high frequency. Note that the encode control unit 507 determines a ratio of intra-frame compression frames based on a frequency Ω. However, for example, a configuration may also be adopted in which a system determination unit is also added to the encode control unit 507, and, if the system determination unit determines that video distribution is to be performed live only, the frequency Ω is replaced by the number of video images that have been transmitted to the current user.

In short, according to this embodiment, the number of times of execution of intra-frame compression per unit time, which is allowable for communication between the image capturing apparatus 501 and the distribution server 500, is distributed to each tile and is set in accordance with the number of times of designation of the tile held in the frequency calculation unit 508. As a result, the communication band between the image capturing apparatus 501 and the distribution server 500 does not become tight, and, regarding a region of interest (tile image) that is designated a larger number of times, an interval at which intra-frame compression is used is shorter, making it possible to shorten a time required for switching a video image. In addition, regarding a region of interest (tile image) that is designated a smaller number of times, an interval at which intra-frame compression is used is longer.

Second Embodiment

Figure 6:
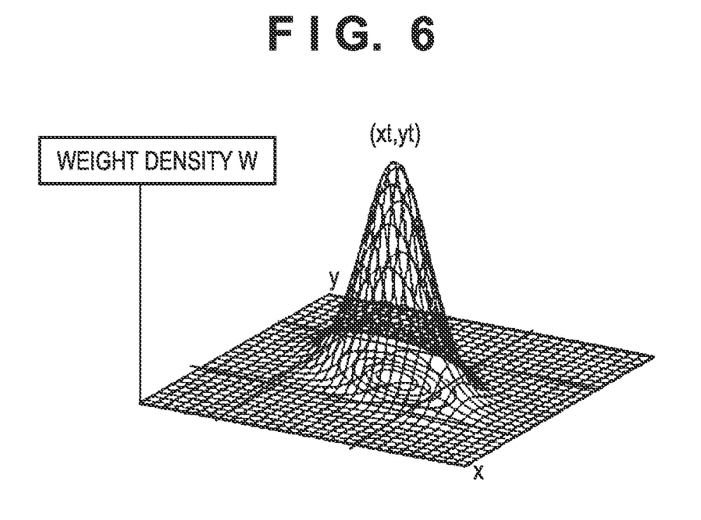
FIG. 6 is a diagram illustrating weight distribution according to a second embodiment.

A second embodiment will be described with reference to FIG. 6. In the second embodiment, the ratio at which intra-frame compression is performed is increased not only for a region that was selected by the user of the client relatively many times, but also a region surrounding the region. An example will be described in which, as a result, responsiveness related to an operation of viewing a region surrounding a region selected by the user (pan/tilt operation) is increased. Note that a pan/tilt operation may be performed by the control unit 550 controlling a camera platform (not illustrated) on which the image capturing apparatus 501 is mounted, or the image capturing apparatus 501 itself may also be provided with a drive unit such that a pan/tilt operation can be performed. It should be understood that this processing is performed in step S75 in FIG. 7.

Similarly to the first embodiment, the number of times intra-frame compression of all of the tiles is performed per second is indicated by N, the number of tiles of each layer is indicated by $m_i$, and the total number of tiles is indicated by M. The number of times $n_i$ intra-frame compression is performed on the i-th layer per second is determined as in Expression (2-1) below.

$$n_i = P_i N \quad (2\text{-}1)$$

Here, $P_i$ indicates a weight between layers, and is determined as indicated by Expression (2-2) below, for example.

$$P_i = \frac{\Omega_{Ai}}{\sum_i \Omega_{Ai}} \quad (2\text{-}2)$$

Here, $\Omega_{Ai}$ indicates the average number of times of selection of each layer that is determined using Expression (2-3) below.

$$\Omega_{Ai} = \frac{\sum_j \Omega_{ij}}{m_i} \quad (2\text{-}3)$$

Regarding $n_i$ distributed in each layer, the most selected region is set as the center (xt, yt) and a weight is determined by envisioning Gaussian distribution. FIG. 6 shows a weight density for determining a ratio at which intra-frame compression is performed on a group of tile images of a certain layer. The higher the weight density is, the higher the ratio at which the intra-frame compression is performed becomes. In a method for obtaining the center (xt, yt), for example, the central position of a tile image transmitted most as a region of interest may be used, and as will be described below, weights of tile image are determined by integrating weight densities at boundaries of the tiles. A weight density w is expressed by Expression (2-4) below.

$$w = Ae^{\frac{(x-x_t)^2 + (y-y_t)^2}{2a^2}} \quad (2\text{-}4)$$

Here, A indicates a normalization factor, and the distribute a is the same in the x direction and v direction, and is a fixed value here for simplification. Accordingly, a weight in each tile image $A_{ij}$ is determined using an error function erf as expressed by Expression (2-5) below.

$$W_{ij} = A \int_{X1_{ij}}^{X2_{ij}} e^{-X^2} dX \int_{Y1_{ij}}^{Y2_{ij}} e^{-Y^2} dY \qquad (2\text{-}5)$$
$$= A'((\text{erf}(X2_{ij}) - \text{erf}(X1_{ij})(\text{erf}(Y2_{ij}) - \text{erf}(Y1_{ij})))$$

Here, $X1_{ij}$, $X2_{ij}$, $Y1_{ij}$, and $Y2_{ij}$ are expressed by Expressions (2-6) to (2-9) below, for example.

$$X1_{ij} = \frac{x_{ij\,min} - x_t}{\sigma} \qquad (2\text{-}6)$$

$$X2_{ij} = \frac{x_{ij\,max} - x_t}{\sigma} \qquad (2\text{-}7)$$

$$Y1_{ij} = \frac{y_{ij\,min} - y_t}{\sigma} \qquad (2\text{-}8)$$

$$Y2_{ij} = \frac{y_{ij\,max} - y_t}{\sigma} \qquad (2\text{-}9)$$

Note that above $X_{ijmin}$, $X_{ijmax}$, $y_{ijmin}$, and $y_{ijmax}$ indicate the minimum value and maximum value of an x coordinate and the minimum value and maximum value of a y coordinate in the tile image $A_{ij}$ of the tile division number j in the layer i. Note that, in the coordinate system, the top left of a tile image before division is used as an origin, the right direction is the positive direction of the X axis, and the downward direction is the positive direction of the Y axis.

When an interval at which intra-frame compression of the tile image $A_{ij}$ is performed is obtained using above $W_{ij}$, Expression (2-10) below is obtained, and the interval of intra-frame compression of the tile image of a region that is close to (xt, yt) is shortened.

$$I_{intv\,A_{ij}} = \frac{1}{n_{ij}} = \frac{\sum_j W_{ij}}{W_{ij} n_i} \qquad (2\text{-}10)$$

It is possible to shorten the maximum switching time for switching to a video image that is selected as a region of interest with a high frequency and a video image of a region surrounding it while suppressing an increase in the code amounts of all of the images, by determining a ratio of intra-frame compression frame of each video image using the above-described method.

Third Embodiment

A third embodiment will be described. According to the third embodiment, a purpose is to increase the responsiveness to a zoom operation on a tile video image selected by the user, by applying weights to the tiles of each layer that includes a region corresponding to a region of interest that was selected most, so as to increase the ratio at which intra-frame compression is performed. A zoom operation corresponds to changing the distribution video image to a layer of a tile video image of a higher resolution that includes a region corresponding to the selected region of interest (zoom in) or a layer of a tile video image of a lower resolution (zoom out). When the user designates a region of interest $A_{ab}$, a group T obtained by extracting tile images that include a region corresponding to the region $A_{ab}$ can be defined as indicated by Expression (3-1) below.

$$T = \{A_{11}, A_{2b(2-a)0}, A_{2b(2-a)1}, \ldots, A_{ab}, A_{a+1b10}, A_{a+1b11}, \ldots, A_{Kb(K-a)u}\} \qquad (3\text{-}1)$$

Here, K indicates the largest layer number, and, in consideration of the region spanning a plurality of tile video images in each layer, $A_{ibyx}$ indicates an x-th video image related to b in the layer i. In addition, y is a value obtained by subtracting a from the layer i. A weight can be described as Expression (3-2) below, for example, in accordance with a layer from a layer b that includes a tile image of the region of interest.

$$W_k = \frac{1}{\sum_{k=1}^{K} (\alpha^{|k-a|} u_k)} \alpha^{|k-a|} u_k \qquad (3\text{-}2)$$

Here, Uk indicates the number of tile images that belong to the group T, in a layer k, and α indicates a weight constant of 1 or smaller.

Accordingly, the interval at which intra-frame compression of k layers is performed is expressed by Expression (3-3) below, and, regarding a layer that is closer to a layer a that includes the region of interest, the interval of the intra-frame compression frames can be made shorter. That is to say, regarding a layer whose resolution is closer to that of the layer a that includes the region of interest, the interval of intra-frame compression frames can be made shorter.

Accordingly, when a video image of a layer whose resolution has been increased or reduced in accordance with a zoom operation instruction made by the user is distributed, it is possible to prevent delay of video distribution.

$$I_{intv\,A_{kb(k-a)u}} = \frac{pM \sum_{k=1}^{K} (\alpha^{|k-a|} u_k)}{N \alpha^{|k-a|} \sum_{k=1}^{K} u_k} \qquad (3\text{-}3)$$

Here, the weight is the same for a plurality of tile images of the k layers for simplification, but, as in the second embodiment, a larger weight may be applied to a tile image that is closer to the region of interest. In addition, p indicates a weight of a video image that includes $A_{ab}$ and a video image that does not does not include $A_{ab}$, and satisfies Expression (3-4) below.

$$p \sum_{k=1}^{K} u_k + p' n(\overline{T}) = M \qquad (3\text{-}4)$$

Here, the relationship between p and p' in Expression (3-4) is determined as expressed by Expression (3-5) below.

$$p = (1 - p') \frac{M}{\sum_{k=1}^{K} u_k} + p' \qquad (3\text{-}5)$$

Note that, $n(\overline{T})$ indicates the total number of tile images that do not belong to T, and is expressed by Expression (3-6) below.

$$n(T) = M - \sum_{k=1}^{K} u_k \qquad (3\text{--}6)$$

It is possible to shorten the maximum switching time for switching to a video image that is selected as a region of interest with a high frequency and a tile image that includes the region and has a different resolution, while suppressing an increase in the code amounts of all of the images, by determining the ratio of intra-frame compression frames of each video image using the above-described method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-207687, filed Dec. 15, 2020 which is hereby incorporated by reference herein in its entirety.

What is claimed is:

1. An image capturing system constituted by an image capturing apparatus and a distribution apparatus that distributes a video image obtained by the image capturing apparatus, via a network,
wherein the image capturing apparatus includes:
an image capturing unit that performs image capturing at a predetermined frame rate, and outputs images of a plurality of resolutions,
a dividing unit that divides each of the images of respective resolutions obtained by the image capturing unit into tiles having a preset size,
an encoding unit that encodes images of tiles obtained by the dividing unit, using intra-frame compression and inter-frame compression, and is capable of independently setting a frame interval at which intra-frame compression is performed for each tile, and
an output unit that outputs encoded data of tiles obtained by the encoding unit to the distribution apparatus, and
wherein the distribution apparatus includes:
a distributing unit that designates a tile corresponding to a region of interest requested from a client on a network, and distributes encoded data of the designated tile as a video stream to the client, and
an encode control unit that changes a frame interval of intra-frame compression frames of a tile corresponding to a region of interest requested from a client on a network, in accordance with the number of times of designation of the tile, and sets the changed frame interval in the encoding unit.

2. The system according to claim 1, wherein
the encode control unit changes a frame interval of intra-frame compression frames of a tile corresponding to a region of interest requested from a client on a network, in accordance with the number of times of designation of each tile, and sets the changed frame interval in the encoding unit.

3. The system according to claim 1, wherein
the changed frame interval is shorter for a tile that has been designated a larger number of times.

4. The system according to claim 1, wherein
the changed frame interval is longer for a tile that has been designated a smaller number of times.

5. The system according to claim 1, further comprising:
a holding unit that, every time a command for designating a region of interest is received from a client on a network, updates and holds the number of times of designation of a tile specified by the command,
wherein the encode control unit obtains a frame interval of intra-frame compression frames for each tile, in accordance with the numbers of times of designation of tiles held by the holding unit, and sets the frame interval in the encoding unit.

6. The system according to claim 5, wherein
the holding unit increases the number of times of designation of a tile for which a size of a region of interest indicated by the command is largest, and holds the increased number.

7. The system according to claim 5, wherein
the encode control unit distributes and sets the number of times of execution of intra-frame compression per unit time, which is allowable for communication between the image capturing apparatus and the distribution apparatus, as the number of times of execution of intra-frame compression per unit time of each tile, in accordance with the number of times of designation held by the holding unit.

8. The system according to claim 1, wherein
the encode control unit determines a weight for each resolution in accordance with the number of times of designation of each tile, and
sets the number of times of execution of intra-frame compression per unit time, which is based on the weight, to be larger, in a region closer to a tile for which the number of times of designation is largest in each resolution.

9. The system according to claim 5, wherein
the encode control unit obtains a resolution and position of a tile for which the number of times of designation held by the holding unit is largest, and with the obtained resolution and position serving as the center, sets the number of times of execution of intra-frame compression per unit time to be larger toward the center, for a plurality of resolutions.

10. A method of controlling an image capturing system constituted by an image capturing apparatus and a distribution apparatus that distributes a video image obtained by the image capturing apparatus, via a network, the method comprising:
at the image capturing apparatus:
(a) performing image capturing at a predetermined frame rate, and outputting images of a plurality of resolutions,
(b) dividing each of the images of respective resolutions obtained in the step (a) into tiles having a preset size,
(c) encoding images of tiles obtained in the step (b), using intra-frame compression and inter-frame compression, where the encoding is capable of independently setting a frame interval at which intra-frame compression is performed for each tile, and
(d) outputting encoded data of tiles obtained in the step (c) to the distribution apparatus, and
at the distribution apparatus,
(e) designating a tile corresponding to a region of interest requested from a client on a network, and distributing encoded data of the designated tile as a video stream to the client, and
(f) changing a frame interval of intra-frame compression frames of a tile corresponding to a region of interest requested from a client on a network, in accordance with the number of times of designation of the tile, and setting the changed frame interval in the step (c).

11. A distribution apparatus that controls an image capturing apparatus that captures images of a plurality of resolutions at a predetermined frame rate, divides each image into tiles having a preset size, and performs intra-frame compression at a frame interval independent for each tile to output encoded data, and distributes encoded data of tiles obtained from the image capturing apparatus, as a video stream to a client on a network, the apparatus comprising:
a distributing unit that designates a tile corresponding to a region of interest requested from a client on a network, and distributes encoded data of the designated tile as a video stream to the client; and
a setting unit that sets, in the image capturing apparatus, a frame interval of intra-frame compression frames of a tile corresponding to a region of interest requested from a client on a network, such that the frame interval varies in accordance with the number of times of designation of the tile.

12. A method of controlling a distribution apparatus that controls an image capturing apparatus that captures images of a plurality of resolutions at a predetermined frame rate, divides each image into tiles having a preset size, and performs intra-frame compression at a frame interval independent for each tile to output encoded data, and distributes encoded data of tiles obtained from the image capturing apparatus, as a video stream to a client on a network, the method comprising:
(a) designating a tile corresponding to a region of interest requested from a client on a network, and distributing encoded data of the designated tile as a video stream to the client; and
(b) setting, in the image capturing apparatus, a frame interval of intra-frame compression frames of a tile corresponding to a region of interest requested from a client on a network, such that the frame interval varies in accordance with the number of times of designation of the tile.

13. A non-transitory computer-readable storage medium storing a program which causes a computer to execute the steps of a method of controlling a distribution apparatus that controls an image capturing apparatus that captures images of a plurality of resolutions at a predetermined frame rate, divides each image into tiles having a preset size, and performs intra-frame compression at a frame interval independent for each tile to output encoded data, and distributes encoded data of tiles obtained from the image capturing apparatus, as a video stream to a client on a network, the method comprising:
(a) designating a tile corresponding to a region of interest requested from a client on a network, and distributing encoded data of the designated tile as a video stream to the client; and
(b) setting, in the image capturing apparatus, a frame interval of intra-frame compression frames of a tile corresponding to a region of interest requested from a client on a network, such that the frame interval varies in accordance with the number of times of designation of the tile.

14. An image capturing apparatus comprising:
an image capturing unit that generates image data of a plurality of different resolutions;
a dividing unit that divides image data of each resolution generated by the image capturing unit into a plurality of tiles;
an encoding unit that encodes image data of each tile obtained through division performed by the dividing unit, using intra-frame compression and inter-frame compression, to generate encoded data;
an obtaining unit that obtains information regarding a frame interval of intra-frame compression frames of the tile; and
an output unit that outputs encoded data of each tile generated by the encoding unit to the distribution apparatus.

* * * * *